United States Patent
Ramirez et al.

(10) Patent No.: US 10,302,316 B2
(45) Date of Patent: May 28, 2019

(54) METALLIC TUBULAR MEMBERS FOR USE IN HVAC OR REFRIGERATION SYSTEMS AND METHODS OF MANUFACTURING THE SAME

(71) Applicant: Heatcraft Refrigeration Products LLC, Richardson, TX (US)

(72) Inventors: Carlos Ramirez, Stone Mountain, GA (US); Steven Pfister, Dunwoody, GA (US)

(73) Assignee: Heatcraft Refrigeration Products LLC, Richardson, TX (US)

( * ) Notice: Subject to any disclaimer, the term of this patent is extended or adjusted under 35 U.S.C. 154(b) by 331 days.

(21) Appl. No.: 15/138,199

(22) Filed: Apr. 25, 2016

(65) Prior Publication Data

US 2017/0307233 A1 Oct. 26, 2017

(51) Int. Cl.
*F24F 1/26* (2011.01)
*B23K 1/00* (2006.01)
*B23K 1/19* (2006.01)
*B23K 1/20* (2006.01)
B23K 101/04 (2006.01)
B23K 101/14 (2006.01)
B23K 103/04 (2006.01)
B23K 103/10 (2006.01)
B23K 103/12 (2006.01)

(52) U.S. Cl.
CPC .............. *F24F 1/26* (2013.01); *B23K 1/0008* (2013.01); *B23K 1/0012* (2013.01); *B23K 1/19* (2013.01); *B23K 1/203* (2013.01); *B23K 2101/04* (2018.08); *B23K 2101/14* (2018.08); *B23K 2103/04* (2018.08); *B23K 2103/10* (2018.08); *B23K 2103/12* (2018.08)

(58) Field of Classification Search
CPC ..... F24F 1/26; B23K 1/0008; F25B 2400/075
See application file for complete search history.

(56) References Cited

U.S. PATENT DOCUMENTS

2012/0256379 A1\* 10/2012 Rubin ................. F16L 55/1152
277/616

\* cited by examiner

*Primary Examiner* — Moshe Wilensky
(74) *Attorney, Agent, or Firm* — Hubbard Johnston, PLLC

(57) ABSTRACT

A metallic tubular member having a closed end member for use in heating, ventilation, and air conditioning (HVAC) systems or refrigeration systems and method of manufacturing are presented. In one instance, the method includes providing a metallic tubular stock member having a first end and a second end, wherein the first end is open and closing the first end of the metallic tubular stock member to form a first closed circular member having an outside diameter $D_1$; forming a sealing aperture having an outside diameter $D_2$ through the first closed circular end, wherein $D_2$ is less than 5 percent of $D_1$; and applying a heat-based sealing process including a metallic flow into the sealing aperture. Other methods and systems are presented.

16 Claims, 2 Drawing Sheets

METALLIC TUBULAR MEMBERS FOR USE IN HVAC OR REFRIGERATION SYSTEMS AND METHODS OF MANUFACTURING THE SAME

TECHNICAL FIELD

This application is directed to manufacturing methods for high-pressure tubing that is suitable for use in high-pressure refrigeration or heating, ventilation, and air conditioning (HVAC) systems.

BACKGROUND

Refrigeration systems and heating, ventilating, and air conditioning (HVAC) systems can be used to regulate the environment within an enclosed space. These systems use a working fluid, or refrigerant, to move heat as desired. The refrigerant typically is contained within a closed system formed from copper tubes.

In the early days of refrigeration, ammonia, carbon dioxide, and other refrigerants were used, but when Freon (dichloro-diflouro-methane) was discovered as a good refrigerant, it became widely adopted for various reasons. Today, because of environmental concerns, other refrigerants are desirable. New refrigerants are in some instances requiring high-pressure systems (compared to Freon based systems). Manufacturing such systems presents many challenges.

SUMMARY

According to one illustrative embodiment, a method of manufacturing a metallic tubular member having a closed end member for use in heating, ventilation, and air conditioning (HVAC) systems or refrigeration systems includes spinning or otherwise forming a closed circular member on an end of a metallic tubular member, drilling or otherwise forming a sealing aperture sized to allow metallic flow therethrough, and brazing the closed circular member such that brazen material flows through the sealing aperture.

According to one illustrative embodiment, a method of manufacturing a metallic tubular member having a closed end member for use in heating, ventilation, and air conditioning (HVAC) systems or refrigeration systems includes providing a metallic tubing member having a first end and a second end, wherein the first end is open and closing the first end of the metallic tubing member to form a first closed circular member having an outside diameter $D_1$. The method further includes forming a sealing aperture having an outside diameter $D_2$ through the first closed circular end, wherein $D_2$ is less than 5 percent of $D_1$ and brazing the first closed circular member until brazen material enters into the sealing aperture.

According to one illustrative embodiment, a method of manufacturing a metallic tubular member having a closed end member for use in heating, ventilation, and air conditioning (HVAC) systems or refrigeration systems includes providing a metallic tubular stock member having a first end and a second end, wherein the first end is open and closing the first end of the metallic tubular stock member to form a first closed circular member having an outside diameter $D_1$. The method further includes forming a sealing aperture having an outside diameter $D_2$ through the first closed circular end, wherein $D_2$ is less than 5 percent of $D_1$ and applying a heat-based sealing process including a metallic flow into the sealing aperture.

According to one illustrative embodiment, a metallic tubular member having a closed end member for use in heating, ventilation, and air conditioning (HVAC) systems or refrigeration systems is presented that is prepared by a process that includes providing a metallic tubular stock member having a first end and a second end, wherein the first end is open; closing the first end of the metallic tubular stock member to form a first closed circular member having an outside diameter $D_1$; forming a sealing aperture having an outside diameter $D_2$ through the first closed circular end, wherein $D_2$ is less than 5 percent of $D_1$; and brazing the first closed circular member until brazen material enters into the sealing aperture.

BRIEF DESCRIPTION

Reference is now made to the following descriptions taken in conjunction with the accompanying drawings, in which.

Figure 3:
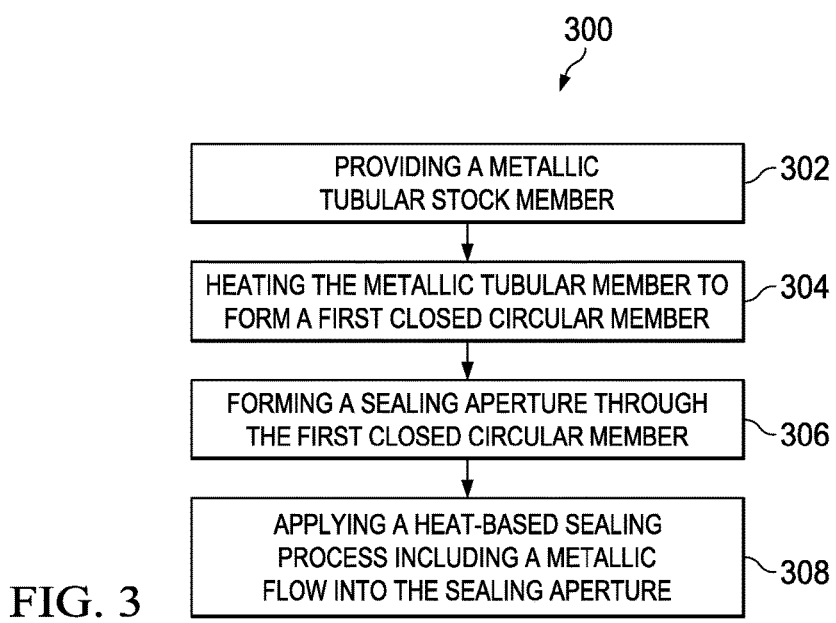
Figure 2A:
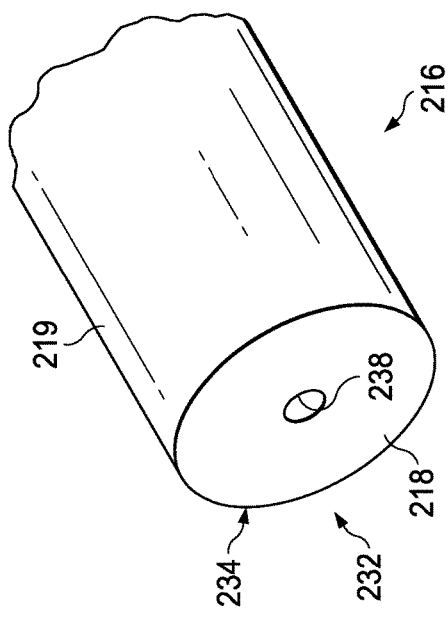
FIG. 2A is a schematic, perspective view of a first end of a metallic tubular stock member having a first closed circular member showing with a residual aperture.
Figure 2B:
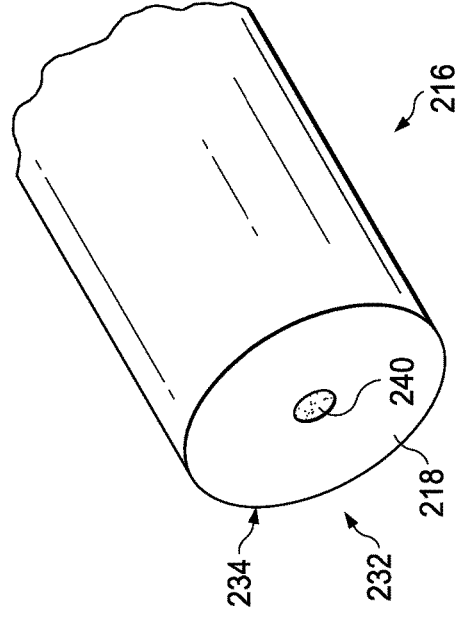
FIG. 2B is a schematic, perspective view of the metallic tubular stock member of FIG. 2A after a sealing aperture has been formed.
Figure 2C:
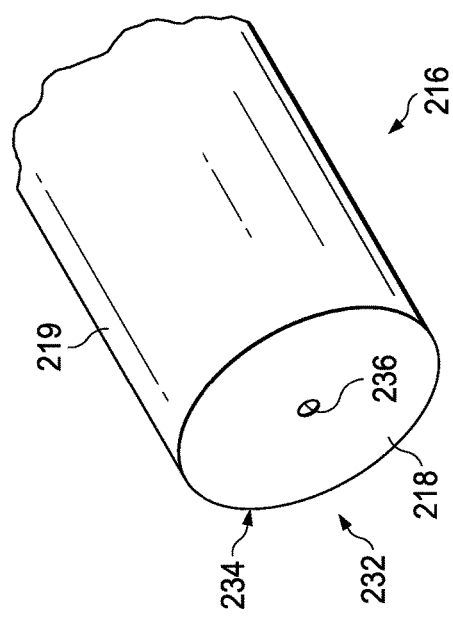
FIG. 2C is a schematic, end view of the metallic tubular stock member of FIG. 2B.
Figure 2D:
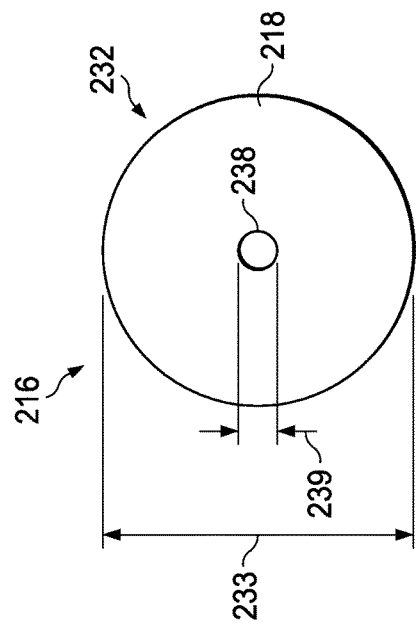

FIG. 2D is a schematic, perspective view of the metallic tubular stock member of FIG. 2B after the first closed circular member has had a heat-based sealing process including a metallic flow, e.g., brazing, applied; and FIG. 3 is a schematic process flow diagram of an illustrative, non-limiting embodiment of a method of manufacturing a metallic tubular member having a closed end member for use in heating, ventilation, and air conditioning (HVAC) systems or refrigeration systems.

DETAILED DESCRIPTION

To accommodate certain refrigerants, e.g., carbon dioxide (CO2), high-pressure tubing must be used with the refrigeration systems or heating, ventilating, and air conditioning (HVAC) systems. For example, in times past with systems that used Freon, the pressure in the tubes in some instances may have been around 450 psig, but today with other refrigerants the pressure needs to be 1750 psig or more. Again, for example and without limitation, it is not uncommon to see 90 bar (1305 psi) and 120 bar (1740 psi) systems for use with transcritical CO2 refrigerant systems. Other pressures of course are possible.

The higher pressure systems require high-pressure tubing systems and these systems in turn typically use metallic tubular members, e.g., alloy copper tubing, that are jointed at various joints. The joints are formed by a heat-based sealing process including a metallic flow, primarily brazing, but other techniques, such as welding, may be used in some applications. In numerous aspects, metallic tubing, such as a copper based tubing, may include a closed end member in its application.

In some applications it is desirable to close the end, not with a cap, but with a technique of causing metal to fold over or otherwise be manipulated to form a closed, circular member at an end. In this process, it is not uncommon for at least one small residual aperture, or "pin hole," to be formed on the end member and while a brazing material may cover the at least one small residual aperture adequately to seal it for lower pressure applications, there is a desire to more securely seal the end member for higher pressure operations, e.g., ones adequate for many non-Freon refrigerants. In this regard, one aspect of the disclosure involves drilling a sealing aperture through the closed circular member that is large enough to allow brazen material or other metallic material flow to freely flow into the sealing aperture. This allows a strong bond to be formed with the brazen material or other metallic flow and to securely seal where the residual aperture would have been. It should be understood that while an example of a header in an HVAC or refrigeration application is given for such an application below, the end member may be used for other applications and purposes. Examples of other applications include, without limitation, when a tube is used for containing or distributing any high pressure gas, such as Oxygen, or Nitrogen, or Air, (or any gas), that may be moved through the pipe for distribution, or other purposes besides HVAC or refrigeration. It is not uncommon in industrial settings to have various gases distributed at high pressures for use in remote locations in this way. Unless otherwise indicated, as used throughout this document, "or" does not require mutual exclusivity.

Figure 1:
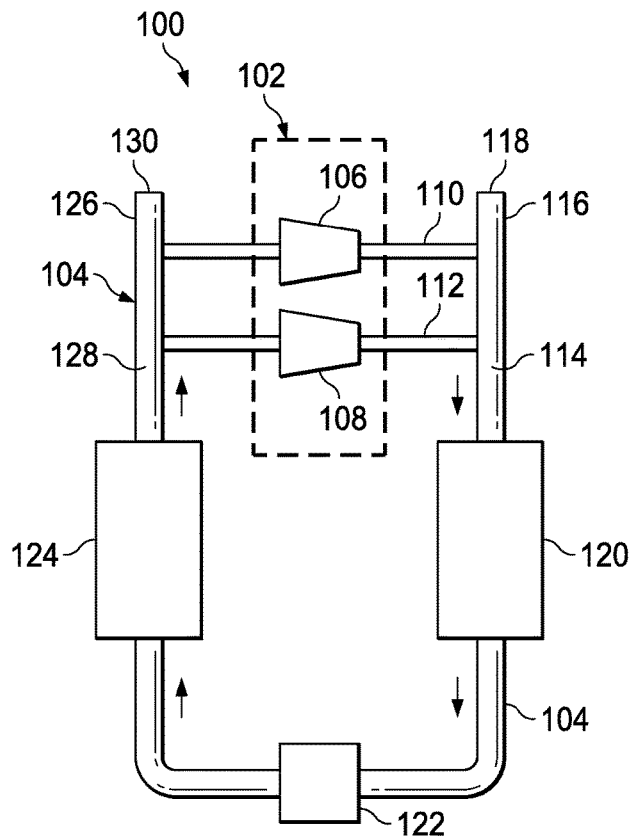
FIG. 1 is a schematic diagram of a high-pressure refrigeration system that incorporates an illustrative, non-limiting embodiment of a metallic tubular member having a closed end member.

Referring now to the drawings and primarily to FIG. 1, an illustrative, non-limiting example of a high-pressure refrigeration system 100 that includes a compressor unit 102 is provided. The various members of system 100 are fluidly coupled by a closed subsystem of metallic tubes 104. The metallic tubes may be for example various types of copper alloy tubes or pure copper, or steel alloys, or aluminum, or other materials used to contain or distribute pressurized gas. The system 100 provides context and one example of an application of metallic tubular members being used.

The compressor unit 102 in this example includes a first compressor 106 and a second compressor 108 for compressing a working fluid. The first compressor 106 discharges the compressed working fluid into a first discharge tube 110 and likewise the second compressor 108 discharges compressed working fluid into a second discharge tube 112. The discharge tubes are fluidly coupled to a discharge header 114 that combines the compressed working fluids into a common flow. The discharge header 114 is a metallic tubular member 116 having a first closed end member 118 as will be described in more detail below. It should be noted that this illustrative embodiment is not to scale and is a schematic diagram of one of many possible examples to show the tubular member 116 having a closed end member in an application.

The discharge header 114 is fluidly coupled to a gas cooler 120 or condenser by the subsystem of metallic tubes 104. The working fluid is cooled in the gas cooler 120 or condenser and is delivered to an expansion device 122. The expanded working fluid, which is obviously further cooled through expansion, is delivered to an evaporator 124 through the subsystem of metallic tubing 104. The working fluid, which has taken on heat, then leaves the evaporator 124 and is delivered to an intake header 126. The intake header 126 is a second tubular member 128 having a second closed end member 130 as will be described in more detail below and which is analogous to the first tubular member.

The system 100 provides one example of an application for a metallic tubular member 116 having a first closed end member 118, but it is just one example. Important aspects of the present disclosure are directed to how to make the closed end member 118 (and by analogy the closed end member 130). Attention will now turn to these aspects in one embodiment.

Referring now primarily to FIG. 2, and initially to FIG. 2A, in making a metallic tubular member 216 with a closed end member 218 for use in heating, ventilation, and air conditioning (HVAC) systems or refrigeration systems, a metallic tubular stock member 219 is provided that has a first end 232 and a second end is provided. The metallic tubular stock member 219 may be, for example, without limitation, from various tubular stock members, including without limitation, a copper alloy tubing. The metallic tubular stock member 219 is processed by manufacturing equipment that heats the first end 232 and forms the first closed circular end member 218. The manufacturing equipment may move the heated material toward a center portion to close the end with a closure member 234. The metallic tubular member 216 may be an example of the metallic tubular member 116 referenced in FIG. 1. For example, this process of closing an end may be conducted with an end forming machine that forms the end of the tube by spinning a tool against the tube to force it closed.

The closure member 234 or closed end member 218 has an outsider diameter $D_1$ 233 (see FIG. 2C). With some frequency, as a byproduct of production, the closure member 234 is formed with a small (compared to $D_1$ or even $D_2$ discussed below) residual aperture 236 (FIG. 2A). The residual aperture 236 may be the size of a pinhole in some instances. In preparing the metallic tubular member 216, the residual aperture 236 may be sealed with a brazen material applied during a brazing process at the closed end 218, but without more it may not be strong enough for high-pressure operations. For this or other reasons, it may be desirable to be assured of a strong bond and seal at the closed end 218 by taking additional steps.

To create a strong connection at the closed end 218, a sealing aperture 238 is formed at a center portion of the closure member 234. The sealing aperture 238 may be formed on top of an observed residual aperture 236 or proactively at a center portion where it is likely to occur. The sealing aperture 238 may be formed by drilling, water jet, laser, or any manufacturing technique for making apertures. In another example, the sealing aperture 238 may be formed by heating a desired portion of the closure member 234, or first closed circular member, and applying a force to the first closed circular member.

The sealing aperture 238, which has an outside diameter $D_2$ 239, may take various sizes. In one embodiment, the sealing aperture 238 is 2 to 6 times the size of the residual aperture 236 that it replaces. In one illustrative embodiment, $D_2$ is less than 5 percent of $D_1$ and in another is less than 2 percent of $D_1$ another is less than 1 percent of $D_1$. In one illustrative, non-limiting embodiment, $D_1$ is 1⅝ inches and $D_2$ is 3/32 inch. In one illustrative embodiment, D2 is 3/32 of inch and D1 is between 1 and 6 inches. Of course, other dimensions are possible. The sealing aperture 238 allows metallic flow, e.g., brazing material, to freely flow through it and facilitate the formation of a stronger bond. In another approach, a weld may be used and a portion of the metallic tubular stock member 219 itself may flow into the sealing aperture 238.

After the sealing aperture 238 is formed, a heat-based sealing process is applied, e.g., the brazing process. In this way, the brazen or brazing material 240 (FIG. 2D) will flow into the sealing aperture 238 and help assure a strong connection between parts and a sealing of what might have been a leak or weak point of the residual aperture 236. The sealing aperture 238 is brazed at the first closed circular member 234 until brazen material enters into the sealing aperture 238. The brazing material may be any acceptable material used in brazing metallic tubular members. In one illustrative, non-limiting example, a brazen material having two percent silver or higher was used. In still another illustrative, non-limiting example, a brazen material having 6-15% for CuFe2P, and 45% for dissimilar materials, may be used. In addition, as part of the brazing process a flux material may be applied having 45% silver alloy or any other suitable flux material may be used. If a weld is used, the first closed circular member 234 is welded sufficiently to cause material from the metallic tubular member to flow into the sealing aperture 238.

Referring now to FIG. 3, an illustrative embodiment of a method 300 of manufacturing a metallic tubular member having a closed end member for use in heating, ventilation, and air conditioning (HVAC) systems or refrigeration systems is presented. At step 302, a metallic tubular stock member is provided that has a first end and a second end and at least the first end is initially open. Then, at step 304, the metallic tubular stock member is closed to form a first closed circular member having an outside diameter D1. The heating process may involve using one of the manufacturing devices referenced above.

Then, at step 306, a sealing aperture is formed that has an outside diameter $D_2$ through the first closed circular end. $D_2$ may be less than 5 percent, 4 percent, 3 percent, 2 percent, or 1 percent of $D_1$ or some other amount. The sealing aperture is sized to allow flow of a metallic material through it to provide a better bond of components. After forming the sealing aperture, a heat-based sealing process including a metallic flow into the sealing aperture is applied at step 308. Step 308 may involve applying a brazing process to cause a brazing material to enter the sealing aperture. As another example, step 308 may involve welding and causing molten metal of the metallic tubular stock member to flow into the sealing aperture. Through this illustrative process, a metallic tubular member having a closed end member is formed. In one illustrative, non-limiting embodiment, a sealing aperture having a diameter of 3/32 inch was formed and brazing material applied having fifteen percent silver.

As used herein, the term "coupled" includes coupling via a separate object and includes direct coupling. The term "coupled" also encompasses two or more components that are continuous with one another by virtue of each of the components being formed from the same piece of material or associated one to another by linkages.

The present invention and its advantages have been disclosed in the context of certain illustrative, non-limiting embodiments. The illustrative descriptions above are not intended to be exhaustive or to limit the invention to the precise forms disclosed. Moreover, it should be understood that various changes, substitutions, permutations, and alterations can be made without departing from the scope of the invention as defined by the appended claims. It will be appreciated that any feature that is described in a connection to any one embodiment may also be applicable to any other embodiment.

What is claimed is:

1. A method of manufacturing a metallic tubular member having a closed end member for use in heating, ventilation, and air conditioning (HVAC) systems or refrigeration systems, the method comprising:
   providing a metallic tubing member having a first end and a second end, wherein the first end is open;
   closing the first end of the metallic tubing member to form a first closed circular member having an outside diameter $D_1$;
   after closing the first end, forming a sealing aperture having an outside diameter $D_2$ through the first closed circular end, wherein $D_2$ is less than 5 percent of $D_1$; and
   brazing the first closed circular member until brazen material enters into the sealing aperture.

2. The method of claim 1, wherein $D_2$ is less than 2 percent of $D_1$.

3. The method of claim 1, wherein $D_2$ is less than 1 percent of $D_1$.

4. The method of claim 1, wherein the step of forming a sealing aperture comprises drilling the sealing aperture.

5. The method of claim 1, wherein the step of forming a sealing aperture comprises forming the sealing aperture by heating a desired portion of the first closed circular member and applying a punching force to the first closed circular member.

6. A method of manufacturing a metallic tubular member having a closed end member for use in heating, ventilation, and air conditioning (HVAC) systems or refrigeration systems, the method comprising:
   providing a metallic tubular stock member having a first end and a second end, wherein the first end is open;
   closing the first end of the metallic tubular stock member to form a first closed circular member having an outside diameter $D_1$;
   after closing the first end, forming a sealing aperture having an outside diameter $D_2$ through the first closed circular end, wherein $D_2$ is less than 5 percent of $D_1$ and greater than a pinhole; and
   applying a heat-based sealing process including a metallic flow into the sealing aperture.

7. The method of claim 6, wherein the heat-based sealing process comprises brazing and the metallic flow comprises a brazing material.

8. The method of claim 6, wherein the heat-based sealing process comprises welding and the metallic flow comprises a portion of the metallic tubular member.

9. The method of claim 6, wherein $D_2$ is less than 2 percent of $D_1$.

10. The method of claim 6, wherein $D_2$ is less than 1 percent of $D_1$.

11. The method of claim 7, wherein $D_2$ is less than 2 percent of $D_1$.

12. The method of claim 8, wherein $D_2$ is less than 2 percent of $D_1$.

13. The method of claim 6, wherein the step of forming a sealing aperture comprises drilling the sealing aperture.

14. The method of claim 6, wherein the step of forming a sealing aperture comprises forming the sealing aperture by heating a desired portion of the first closed circular member and applying a punching force to the first closed circular member.

15. A method of manufacturing a metallic tubular member having a closed end member for use in heating, ventilation, and air conditioning (HVAC) systems or refrigeration systems, the method comprising:
   providing a metallic tubing member having a first end and a second end, wherein the first end is open;
   closing the first end of the metallic tubing member to form a first closed circular member having an outside diameter $D_1$;

forming a sealing aperture having an outside diameter $D_2$ through the first closed circular end, wherein $D_2$ is less than 5 percent of $D_1$;

brazing the first closed circular member until brazen material enters into the sealing aperture; and wherein the step of forming a sealing aperture comprises drilling the sealing aperture.

16. A method of manufacturing a metallic tubular member having a closed end member for use in heating, ventilation, and air conditioning (HVAC) systems or refrigeration systems, the method comprising:

providing a metallic tubular stock member having a first end and a second end, wherein the first end is open;

closing the first end of the metallic tubular stock member to form a first closed circular member having an outside diameter $D_1$;

forming a sealing aperture having an outside diameter $D_2$ through the first closed circular end, wherein $D_2$ is less than 5 percent of $D_1$;

applying a heat-based sealing process including a metallic flow into the sealing aperture; and wherein the step of forming a sealing aperture comprises drilling the sealing aperture.

\* \* \* \* \*